United States Patent

McMahon

[15] 3,635,539
[45] Jan. 18, 1972

[54] WIDE-ANGLE HOLOGRAPHIC APPARATUS

[72] Inventor: Donald H. McMahon, Carlisle, Mass.
[73] Assignee: Sperry Rand Corporation
[22] Filed: Aug. 18, 1969
[21] Appl. No.: 850,791

[52] U.S. Cl. ................................................. 350/3.5
[51] Int. Cl. ........................................... G02b 27/00
[58] Field of Search ........................... 350/3.5; 96/27 H

[56] References Cited

OTHER PUBLICATIONS

Denisyuk, Optics & Spectroscopy, Vol. 15, No. 4, Oct. 1963, pp. 279–284
Vandernarker et al., Applied Physics Letters, Vol. 10, No. 2, Jan. 1967, pp. 35–36.
Burckhart, Jour. of the Optical Society of America, Vol. 58, No. 2, Feb. 1968, pp. 241–246.

Primary Examiner—David Schonberg
Assistant Examiner—Ronald J. Stern
Attorney—S. C. Yeaton

[57] ABSTRACT

A method and apparatus for constructing wide angle holograms. The construction apparatus comprises propagating onto a Ronchi ruling and photographic plate serially disposed in the path of the beam. An object of which a holographic recording is to be obtained is positioned on the side of the plate remote from the light source and ruling. The ruling precludes the direct light beam from impinging on various regions of the plate which is canted with respect to the propagational axis of the direct beam so that the light propagating through the plate is partially reflected from its rear surface thereby forming a reference beam which is directed onto regions of the emulsion devoid of direct light. The light transmitted through the plate onto the object is scattered therefrom whereupon that part of the scattered light directed back onto the plate interferes with the reflected reference beam to form the hologram.

14 Claims, 2 Drawing Figures

INVENTOR
DONALD H. MCMAHON
BY
ATTORNEY

WIDE-ANGLE HOLOGRAPHIC APPARATUS

BACKGROUND OF THE INVENTION

1. Field of the Invention

This invention relates to apparatus for recording wide-angle holograms and to the method for recording such holograms and reproducing images of the object information contained therein.

2. Description of the Prior Art

The field of view of displays provided with flat holographic recording media have been restricted heretofore to comparatively small angles typically on the order of 20°. A recent development in the art disclosed a holographic display apparatus comprising an emulsion-coated transparent cylinder illuminated by a divergent light beam. In the recording process the object which is to be recorded is positioned within the cylinder whereupon a fringe pattern representative of the object is formed in the emulsion as a consequence of the interference between light rays directly incident on the emulsion and light rays reflected or scattered thereon from the object. In the reconstruction process, with the object removed from the interior of the cylinder, the divergent light beam incident on the developed emulsion produces a display through an angle of 360° measured about the axis of the cylinder. The angular extent of the display in a plane including the axis is, of course, limited by the length of the cylinder, and obviously 360° coverage cannot be provided in this direction.

Investigations have also continued with noncircular holographic recording media. In these devices recording is generally accomplished by directing part of the energy from a light source directly onto the recording media, usually a photographic plate, while the remaining energy is scattered onto the recording media from the object which is to be recorded. Since the field of view of the object and the reproduced image thereof is determined by the angle subtended at the recording medium by each point on the object, it is apparent that the angular viewing range can be enlarged by moving the object as close as possible to the recording medium. Geometrical considerations preclude placing the object in close proximity with the recording medium during recording, however, since the object would obviously intercept part or all of the light in the beam which is intended to be propagated directly onto the recording medium.

In the interest of circumventing the foregoing problem, experimentation has been conducted with flat photographic plates disposed intermediate a light source and an object which is to be recorded. In this setup part of the light energy transmits completely through the plate and is scattered from the object such that at least part of the scattered light impinges on the film emulsion. Another part of the energy in the light beam propagating through the plate is reflected from the rear surface thereof as a reference beam to interfere with the scattered light incident on the emulsion. Inasmuch as the object is located on the side of the photographic plate remote from the light source, it does not intercept the reflected reference beam and thereby disrupt the recording process. Hence, the object can be located as close as desired to the film. The efficiency of this apparatus, that is the amount of light which is diffracted into the first order (virtual image) lobe upon reconstruction of the image, and the contrast of the reconstructed image is seriously degraded. These results obtain because exposure of the film is caused predominately by the direct beam with only minor portions of the reflected reference and scattered beams being superimposed thereon to form the holographic interference pattern.

SUMMARY OF THE INVENTION

The present invention provides for wide-angle viewing from substantially any point in a hemisphere about a holographic recording medium. In a preferred embodiment of the invention a hologram is formed in a photographic emulsion by disposing the emulsion relative to a mask and an object which is to be recorded such that the mask is located between the emulsion and the light source, and the object is located on the side of the film opposite from the mask. The reference beam is obtained by reflection from the rear surface of the photographic plate, that is the surface proximate the object, while the scattered object beam is obtained from light propagating through the plate and impinging on the object. In this manner the object can be located immediately adjacent the film thereby enabling wide angle viewing during reconstruction. In this instance, the prior limitations regarding efficiency and contrast are eliminated or at least substantially reduced by the provision of the mask which operates to preclude the direct light beam from the source from striking all regions of the emulsion. In addition, the plate is oriented so that the reflected reference beam (obtained from that part of the direct light beam which propagates through the mask) is directed onto the regions of the emulsion unexposed to the direct light. Since the scattered beam from the object strikes all regions of the emulsion, a high-quality holographic interference pattern is formed in the region thereof devoid of exposure to the direct light. By judicious selection of the mask pattern, as will be explained subsequently in the Description of the Preferred Embodiment, it can be assured that any modification of the holographic pattern and reconstructed image resulting from the presence of the mask will be imperceptible to the human eye.

DESCRIPTION OF THE PREFERRED EMBODIMENT

Figure 1:
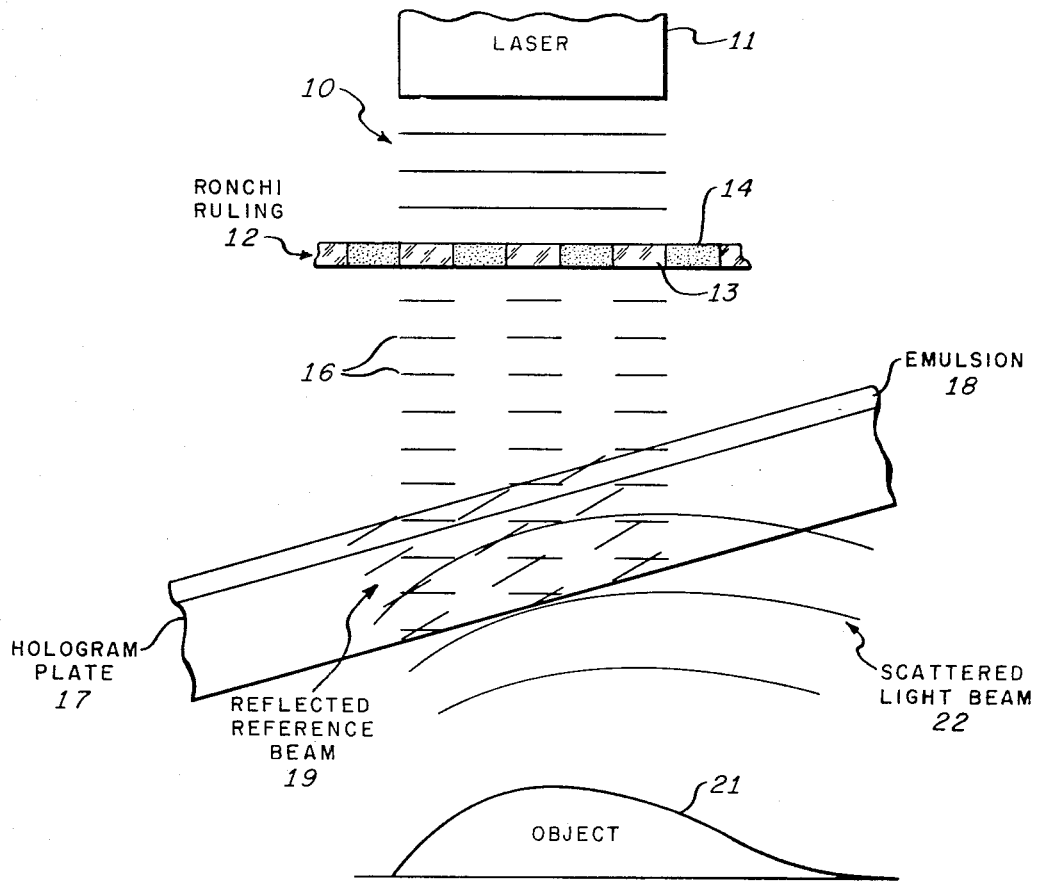
FIG. 1 is a simplified schematic presentation of apparatus used for recording a hologram in accordance with the present invention.

Referring to FIG. 1 collimated light beam 10 emitted from laser 11 propagates onto Ronchi ruling 12 consisting of alternate parallel transparent and opaque lines 13 and 14. The opaque lines block the light rays incident thereon so the laser beam is transmitted through only the transparent lines to form light beams 16 which impinge directly on photographic plate 17. The photographic plate is oriented with the emulsion 18 proximate the ruling and is canted relative to the propagational axis of the light beams transmitted therethrough. Upon striking the rear surface of the film the light beam is partially reflected thereby forming reflected reference beams 18, the film being canted such that the reflected reference beams strike the emulsion in the regions unexposed to the direct beams transmitted through the grating. Formation of the reference beams can be provided either by coating the rear surface of the film with a partially reflecting material or by antireflection coating the rear surface and using a separate partially reflecting member apart from the plate. For simplicity of construction, however, adequate results can be obtained simply by using the reflective properties provided by the inherent refractive index mismatch existing between the film and surrounding air. Good results have been obtained with a refractive index mismatch at the plate-air interface providing approximately 4 percent reflectivity. An object 21, of which a holographic recording is to be obtained, is positioned behind the plate whereby that part of the energy in light beams 16 which transmit through the rear surface of the plate strikes the object and is reflected or scattered therefrom. The scattered light 22 which propagates back through the plate also impinges on the emulsion whereat it interferes with the reflected reference beams to form the holographic fringe pattern. As will be explained subsequently, these fringe patterns consist of Bragg diffraction planes which enable high-quality virtual images of the object to be viewed over a wide angular range unimpaired by the diffracted real images. It should be noted that the reflected reference beams do not have to be confined to the regions of the emulsion unexposed to the direct light but can partially or completely overlap the exposed regions. The essential point to be recognized is that the interference patterns of interest, namely those which operate to produce the reconstructed image, are formed only in the emulsion regions which receive no direct light.

The object which is to be recorded is preferably placed immediately adjacent the photographic plate almost in contracting relation therewith to maximize the angle subtended by any point on the object as viewed through the plate. This physical arrangement of the object and plate is also more readily compatible with the coherence qualities of the laser source for assuring maximum viewing angle and depth of field. Since the total path length, that is, the distance from the laser to the film emulsion, is longer for the object scattered light than the total path length of the reflected reference beams, the laser must have a degree of coherence equal to or greater than the difference in these path lengths to assure proper construction of the holographic interference pattern. Coherence of the light source relates to the ability to determine the phase relationship between the light at one point and that at another point at a given instant, or from another point of view, to the ability to determine the phase of the light at one instant with respect to its phase at another instant. The greater the coherence the larger the separation in time or space may be while still enabling the phase relationships to be determined. For a conventional helium-neon laser simultaneously oscillating in approximately 10 to 20 modes the coherence length is of the order of ±10 inches. Thus, for a field of view of 120° the object to be recorded should not be more than 3–5 inches from the film. This, of course, also restricts the depth of the object to 3–5 inches. The foregoing dimensions can be determined simply by noting that if the furthest point of the object is 3–5 inches from the film and light is reflected from that point at an angle of 60° with respect to the normal to the film, then the maximum total distance traveled by the object scattered light in excess of that traveled by the reflected beam will be 10 inches. The angle and depth of the field can be increased to the extent that the differential path lengths may differ by many feet simply by using an extended coherence light source. This can be obtained for example with a laser operating in a single longitudinal mode or three or four such modes at most.

The Ronchi ruling also is preferably placed close to the film. Since the function of the ruling is to preclude light from the laser from impinging directly on certain regions of the emulsion, it will be appreciated that ruling patterns other than those shown in the figure could be used as long as the orientation of the plate is compatible with the pattern to assure that the reflected reference beams are incident on emulsion regions unexposed to the direct beams from the light source. The ruling does, of course, produce a diffraction pattern which can disrupt the viewability of the recorded hologram unless certain precautions are taken. For instance, if the line spacing on the ruling is too large, the pattern of the ruling will be objectionable because it is easily resolvable by the human eye. On the other hand, if the line spacing is too small, the diffraction lobes of the viewed object produced by the ruling will be sufficiently widely spaced in angle that an observer looking through the film to view the reconstructed image of the object would actually see several diffraction order images. The pattern on the ruling is preferably selected therefore so as to balance off the effects of visibility of the ruling against the diffraction pattern resulting therefrom, thereby providing suitable definition and contrast on both the plate and the reconstructed image. This can be attained by using a line spacing in the range of two to five lines per millimeter with the ruling separated from the film approximately 0 to 3 inches. This spacing will assure that a well-defined shadow image of the ruling is formed on the photographic plate.

Another feature of interest regarding the mask is that by proper design it can be arranged for a plurality of objects to be recorded on respective discrete sections of the photographic plate. This can be accomplished by using direct light beams of different wavelength impinging on the plate at either the same or different angles for the realization of color holography or alternatively by directing a beam of a single wavelength onto the plate at successively different angles. For example, if the mask has rulings arranged such that the opaque lines are twice as wide as the transparent lines, a beam could be directed through the transparent lines at an angle which causes it to form reflected reference beams which strike one half of each unexposed emulsion region during the process of recording one object. To record a second object the angle of the direct light beam can be altered so that the reflected reference beams strike the other half of the unexposed emulsion regions. Then an image of one or the other of the recorded objects can be produced by directing a playback beam onto the relevant portions of the plate at the appropriate angle, that is with the same orientation as the pertinent reflected reference beam.

Figure 2:
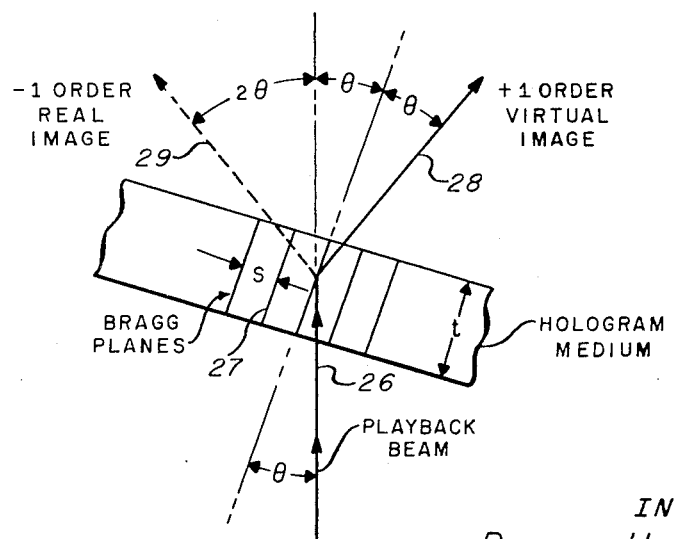
FIG. 2 is a simplified illustration depicting reconstruction of an image holographically recorded by the apparatus of FIG. 1.

Another matter which has to be considered is shrinkage in the thickness of the emulsion occuring during development of the photographic film. This problem can be ameliorated to a great extent by using a film having an emulsion incorporating a swelling agent such as 2, 2′, 2″-Nitrilotriethanol. Such film can be purchased from Eastman Organic Chemical Company. The swelling agent is readily introduced into any conventional film simply by soaking. In any case one must be aware of both the possibility of emulsion shrinkage and the deleterious effects resulting therefrom. The nature of this problem will be more readily understood from a reading of the following material with reference to FIG. 2, which depicts apparatus for reconstructing the holographically recorded data.

Reconstruction is accomplished by illuminating the plate with a playback light beam 26 directed onto the plate at the same angle as the reflected reference beam used in the recording process. For applications in which the image is to be observed from substantially any location in a hemisphere above the plate, the plate is preferably oriented such that the playback beam can be directed vertically upward. In this way it will be least likely to propagate directly into the eye of an observer stationed slightly to the side of the plate. Further, to aid in this objective both the beam provided by the laser during recording and the playback beam used during reconstruction can be made slightly convergent. Lines 27 in the plate represent Bragg diffraction planes formed by the interference between a reflected reference beam and light scattered from a particular point on the object during the construction process. These planes define alternate parallel regions of high and low absorption and are characteristic of thick film holography wherein the spacing between the interference fringes is considerably smaller than the thickness of the film. The planes area actually confined to very small localized regions, the enlarged presentation in the drawing being used solely for simplicity of illustration. Since each point on the object scatters light onto all regions of the film, Bragg diffraction planes having various spacing (s) and angular orientation ($\theta$) are formed in superimposed relation on all parts of the film where the object scattered and reflected reference beams interfere with one another. More specifically, a given point on the object scatters light in a manner to establish localized Bragg planes throughout the film, the orientation and spacing of the planes being formed according to the perspective of the object as viewed by the various points on the film. Each point on the object has the same effect on the film and therefore Bragg planes representing all parts of the object are superimposed throughout the film.

An understanding of the effect produced by the Bragg planes and the way in which this effect is related to the emulsion shrinkage problem can be obtained by considering the Bragg planes corresponding to a particular perspective view of an individual point on the object. Thus, in FIG. 2 which depicts only the emulsion layer of the film, playback beam 26 is incident on Bragg planes 27 at an angle $\theta$ and accordingly is reflected therefrom an angle $\theta$ thereby forming the positive first order diffraction lobe 28 at an angle $2\theta$ from playback beam 26, the diffraction lobe being representative of a virtual image of the corresponding Bragg plane producing point on the object as is well understood by those skilled in the art. Formation of the virtual image lobes by virtue of reflection of the playback beam from the Bragg planes is a basic factor relating to the brightness and quality of the reconstructed images. In this respect it should be noted that although the invention can be used with both absorption and phase type holograms, the former have been found to produce better results. This is believed to be attributable to the large amount of scattering which is usually experienced with phase holograms. Beam 29 corresponding to the negative first order diffraction lobe is also produced in response to the incident playback beam. This beam presents a real image of the same point on the object. It will be appreciated from the previous comments that other Bragg planes formed on the film, representing the object in different perspective, will provide positive first order diffraction lobes (virtual images) collinearly aligned with the illustrated real image lobe. As a consequence, the intensity of the real image lobes must be substantially less than the virtual image lobes to assure unimpaired viewing of the latter. If the thickness ($t$) of the emulsion shrinks during development of the film, both the angular orientation and spacing of the Bragg planes will be altered from the values imparted during recording. Further, since the amount of shrinkage is proportionate to the thickness of the emulsion, the greater both the shrinkage and diminution of image quality will be as the emulsion thickness increases. A very thin emulsion, on the other hand, will produce substantially equal intensity virtual and real images as is obtained from a thin diffraction plate particularly at small angles. The emulsion must therefore be sufficiently thick to assure adequate discrimination between the real and virtual images particularly at small viewing angles relative to the reconstructing light beam. Hence, the emulsion thickness should be selected to provide a compromise between the undesirable effect of equal intensity positive and negative lobes provided by very thin emulsions and degradation of image quality caused by excessive shrinkage of a thick film.

I claim:

1. Apparatus for recording a wide angle hologram comprising
    a holographic recording medium,
    a coherent light source for propagating a direct light beam toward said recording medium,
    a mask having a plurality of respective transparent and opaque sections disposed in the path of the direct light beam intermediate said light source and said recording medium at a suitable distance from the latter in accordance with the spacing between adjacent transparent sections of said mask to preclude the direct light beam from impinging on a plurality of spatially separated regions of said recording medium so that the recording medium is exposed to said direct light only in the regions interspersed with said plurality of spatially separated regions, and
    means for reflecting part of the light transmitted through said recording medium to form a reflected reference beam which impinges on at least said plurality of spatially separated regions of the recording medium while the light transmitted through said reflecting means is directed onto an object disposed in its path to from a reflected object beam at least part of which also impinges on said plurality of spatially separated regions whereat it interferes with said reflected reference beam to form a holographic pattern representative of the object.

2. The apparatus of claim 1 wherein the light source is a laser.

3. The apparatus of claim 1 wherein the holographic recording medium is canted relative to the propagational axis of the beam emitted from said source so that the reflecting means is provided by the refractive index mismatch between the ambient medium and the surface of said recording medium opposite from the surface of incidence of the beam emitted from the source.

4. The apparatus of claim 1 wherein the holographic recording medium is a photographic plate having the photosensitive emulsified surface thereof proximate the mask.

5. The apparatus of claim 4 wherein the photographic plate is canted relative to the propagational axis of the beam emitted from the source so that the reflecting means is provided by the refractive index mismatch between the ambient medium and the surface of the plate opposite from the surface of incidence of the beam emitted from the source.

6. The apparatus of claim 5 wherein the mask is a Ronchi ruling having alternate transparent and opaque lines with a resolution in the range of 2–5 lines per millimeter.

7. The apparatus of claim 5 wherein the emulsion on the photographic plate includes a swelling agent to minimize shrinkage attendant to development of the plate.

8. The apparatus of claim 5 wherein the source is a laser.

9. The apparatus of claim 8 wherein the beam provided by the laser is slightly convergent.

10. The apparatus of claim 1 wherein the spacing between adjacent transparent regions of said mask is sufficiently small so that the spacing of said spatially separated regions is not normally discernible.

11. The apparatus of claim 10 wherein the holographic recording medium is canted relative to the propagational axis of the bean emitted from said source so that the reflecting means is provided by the refractive index mismatch between the ambient medium and the surface of said recording medium opposite from the surface of incidence of the beam emitted from the source.

12. A method of producing a hologram comprising the steps of
    positioning a mask having a plurality of respective transparent and opaque regions in the path of a direct light beam,
    positioning a recording medium behind the mask and closely adjacent thereto so that direct light propagated through the mask is incident on a plurality of spatially separated regions of the recording medium in accordance with the pattern of transparent regions on the mask thereby exposing said plurality of spatially separated regions,
    providing for a portion of said direct light which is transmitted through the recording medium to be reflected as a reference beam back onto at least those regions of the recording medium which are interspersed with said plurality of spatially separated regions, and
    directing another portion of the transmitted light onto an object to form an object beam which is also reflected back onto at least those regions of the recording medium which are interspersed with said plurality of spatially separated regions thereby causing interference between said reflected reference and object beams.

13. A method of reconstructing an image of an object recorded as a hologram in a recording medium be interference between coherently related reflected reference and object beams derived from a direct beam after propagation thereof in succession through a mask and the recording medium disposed in closely adjacent relation with one another wherein the mask has a plurality of respective transparent and opaque regions so that only certain regions of the recording medium are exposed to the direct beam and the hologram is formed in the regions of said recording medium other than said certain regions, said method comprising the step of
    illuminating the recording medium with a coherent light beam thereby producing an image of the object recorded in the hologram.

14. The method of claim 13 wherein the central axis of the coherent light beam is incident on the recording medium along the same direction and at the same angle as used for recording the hologram.

* * * * *